United States Patent [19]
Thompson et al.

[11] 3,923,116
[45] Dec. 2, 1975

[54] ELECTRIC VEHICLE HAVING IMPROVED BATTERY RECONNECT

[75] Inventors: Francis T. Thompson; James A. Bauer, both of Murrysville, Pa.

[73] Assignee: Westinghouse Electric Corporation, Pittsburgh, Pa.

[22] Filed: Jan. 2, 1974

[21] Appl. No.: 430,107

[52] U.S. Cl. ................. 180/65 R; 105/50; 318/93; 318/139
[51] Int. Cl.² ......................................... B60L 11/18
[58] Field of Search ........ 180/65 R; 65 F, 65 A, 60; 318/139, 84, 95, 93, 50, 81; 105/50

[56] References Cited
UNITED STATES PATENTS

| | | | |
|---|---|---|---|
| 2,571,180 | 10/1951 | Ball et al. | 180/65 R X |
| 3,190,387 | 6/1965 | Dow | 180/65 R |
| 3,387,194 | 6/1968 | Banks | 318/139 |
| 3,454,122 | 7/1969 | Grady, Jr. | 180/65 R |

FOREIGN PATENTS OR APPLICATIONS

| | | | |
|---|---|---|---|
| 1,074,443 | 7/1967 | United Kingdom | 180/65 R |

*Primary Examiner*—Leo Friaglia
*Assistant Examiner*—Milton L. Smith
*Attorney, Agent, or Firm*—W. A. Elchik

[57] ABSTRACT

A method and apparatus for reconnecting batteries of an electric vehicle from parallel to series or from series to parallel with reduced current transients and smooth vehicle operation. When the batteries are to be reconnected to yield a different voltage level they are isolated from the power circuit of the electric vehicle. Field current flowing through the separately excited field of the direct current drive motor is varied to match the drive motor's operating state for the reconnected voltage level to be provided. When the drive motor is operating at a condition compatible with the new voltage level the batteries are reconnected without excess vehicle jerk or high current transients. The apparatus for isolating the batteries while the field current is being adjusted and for reconnecting the batteries after the field current is adjusted and the motor is brought to a condition compatible with the new voltage may take the form of diodes or a first set of contacts in the parallel paths through the batteries and a contactor or second set of contacts in the series path through the batteries. The contactor or each of the first and second sets of contacts is opened or closed as necessary to isolate or connect the batteries as desired.

14 Claims, 8 Drawing Figures

ELECTRIC VEHICLE HAVING IMPROVED BATTERY RECONNECT

CROSS REFERENCES TO RELATED APPLICATIONS

This application is related to the following applications: (1) U.S. Pat. No. 3,845,368; (2) U.S. Pat. Application Ser. No. 346,199; (3) U.S. Pat. Application Ser. No. 475,236; (4) U.S. Pat. Application Ser. No. 437,405; (5) U.S. Pat. Application Ser. No. 448,862.

BACKGROUND OF THE INVENTION

This invention relates to electric vehicles and more particularly to a battery reconnect for use on an electric vehicle propelled by a separately excited field controlled direct current motor.

In most prior art electric vehicle speed control systems a direct current DC chopper control and a series wound drive motor are used. The chopper is placed in series between a DC power source and a series wound drive motor. The DC chopper controls the speed of the DC series motor by controlling and interrupting the full armature current. The speed of the DC drive motor is controlled by a conventional armature chopper controller which provides complete control of the motor over its entire speed range. The prior art DC chopper controls the time of the pulses and/or the magnitude of the pulses being fed to the armature of the DC drive motor. By varying the parameters of the driving pulses being fed to the armature of the DC drive motor the speed of the drive motor can be varied. The DC chopper control for armature current coupled with series wound motors is the most commonly used approach for driving prior art electric vehicles. Since the chopper must control the full armature current it must of necessity be of a large size to handle the large currents involved. Prior art DC choppers required in the armature circuit are bulky and expensive. The conventional chopper controller, since it must interrupt and control full armature current, requires expensive high power thyristors and complicated control circuitry for switching and controlling the load current in the armature circuit. Due to the large currents being interrupted cooling of the controller is a problem. Conventional armature chopper controls draw high current pulses from the battery unless a large, heavy armature current choke is used. This choke adds to system losses. If the choke is not used the current pulses will cause increased battery losses.

As disclosed in cross-referenced U.S. Pat. No. 3,845,368 the use of an electronic system for controlling the torque speed characteristics and regenerative braking of a separately excited drive motor for use on an electric vehicle was taught. The torque speed characteristics were controlled by varying the separately excited shunt field of the drive motor. The invention disclosed in U.S. Pat. No. 3,845,368 controlled the speed of the DC electric drive motor from some base speed to a maximum speed. A problem with this speed control system is that the base speed of the DC drive motor is fixed. It is desirable to be able to operate the DC drive motor at a speed lower than the normal operating base speed. This can be accomplished by connecting the batteries in parallel so as to obtain a lower output voltage. The output voltage determines the base speed of the DC drive motor. By providing for series and parallel operation of the batteries two base speeds can be achieved. In prior art connection switching schemes, switches which connected the batteries in one configuration are opened and switches connecting the batteries in another configuration are quickly closed. That is, the batteries are rapidly switched from a connection yielding one voltage level to another connection at a different voltage level. When this is attempted with a direct current drive motor having a separately excited field excessive current transients and vehicle jerk result. It is desirable to have a battery reconnect means which can change the supply voltage level without excessive current transients or jerky vehicle operation.

SUMMARY OF THE INVENTION

This invention teaches a method for switching the power batteries in an electric vehicle driven by a separately excited DC motor from a parallel connection to a series connection without high current transients or vehicle jerk. This switching can be accomplished by preventing current from flowing into the batteries from the drive motor and by increasing the current flowing through the separately excited field windings to a level determined by the drive motor speed and the series connected voltage level. When the current flowing through the separately excited winding reaches a satisfactory level the series connection of the batteries can be completed without vehicle jerk or excessive current transients. Battery reconnection of an electric vehicle, propelled by a DC motor having a separately excited field, from a first connection at one voltage level to a second connection at another voltage level can be accomplished by isolating the batteries and changing the field current flowing through the separately excited field winding to a value comparable with drive motor speed and voltage for the second connection. When the desired field current value is achieved the batteries can be reconnected into the power circuit.

The teaching of this invention can be used in conjunction with a torque converter as disclosed in U.S. Pat. Application 346,199 to provide complete speed control over the entire vehicle speed range.

This application discloses an electric vehicle including switching apparatus for changing battery connections from parallel to series or from series to parallel. A direct current drive motor including a separately excited field winding for controlling speed of the drive motor is provided. A field control means for controlling the current flowing in the motor field winding is provided. A contactor is disposed in a series connection through the batteries and current stopping means are disposed in a parallel connected circuit through the batteries to prevent current flow into the batteries during a switching operation. Sensing means for determining when to switch the battery from a parallel to a series connection and for controlling the field control means to vary current flowing through the field winding is also provided.

In one embodiment of the invention diodes are placed in the parallel path through the batteries and a contactor is disposed in the series path through the batteries. When switching from a low voltage parallel battery connection to a higher voltage series battery connection, the contactor is kept open while the current through the field winding is increased to provide an increased level of back emf generated in the motor which is compatible with the voltage obtained from the series battery connection. When this level of field current is reached the series contactor is closed impressing the higher series voltage on the direct current drive motor. When this embodiment is switched from the high voltage series battery connection to a lower voltage parallel battery connection the series contactor is opened and the field current is allowed to drop to a level compatible with the lower voltage parallel connection. The diodes disposed in the parallel circuit through the batteries prevent the flow of large regenerative currents into the batteries when switching to the lower voltage level and thus prevent the large deceleration jerk which would accompany such a regenerative current flow. Thus this embodiment provides a means for connecting batteries in series or parallel utilizing only one contactor and allowing switching without high current transients or vehicle jerk.

In another embodiment of the invention a first group of contacts are disposed in the parallel path through the batteries and a second set of contacts are disposed in the series path through the batteries. When switching voltage levels all contacts are open and the field current is varied to a level compatible with the reconnected voltage level. When the desired field current is obtained the batteries are reconnected to supply power to the direct current drive motor. For example, when going from a low voltage parallel connection to a high voltage series connection all contacts are open and the field current is increased to a predetermined level after which the second set of contacts reconnecting the batteries in series is closed. In going from a series connection to a parallel connection all contacts are open and the field current is decreased to the desired level then the first group of contacts reconnecting batteries in parallel are closed. These embodiments provide for relatively jerk-free low current transient operation.

Alternatively an isolating contactor can be provided in the electric line between the batteries and the drive motor, for isolating the batteries during switching. A single contactor having normally open and normally closed contacts can then be used to switch battery connections. During switching the isolating contactor is opened and the field current is changed to the desired level for surge free switching.

In these embodiments equal current drain on all batteries used in both the high voltage series connection and the low voltage parallel connection is provided. That is, all batteries are utilized equally in either connection.

It is an object of this invention to provide improved battery reconnecting for electric vehicle which reduces switching current transients and vehicle jerk.

It is a further object of this invention to provide an embodiment which permits switching from one connection to another utilizing a single set of contacts.

It is a still further object of this invention to provide a switching construction having equal drain on all batteries in both the high voltage series and the lower voltage parallel connections.

BRIEF DESCRIPTION OF THE DRAWINGS

For a better understanding of the invention reference may be had to the preferred embodiments exemplary of the invention shown in the accompanying drawings, in which.

DESCRIPTION OF THE PREFERRED EMBODIMENTS

Figure 1:
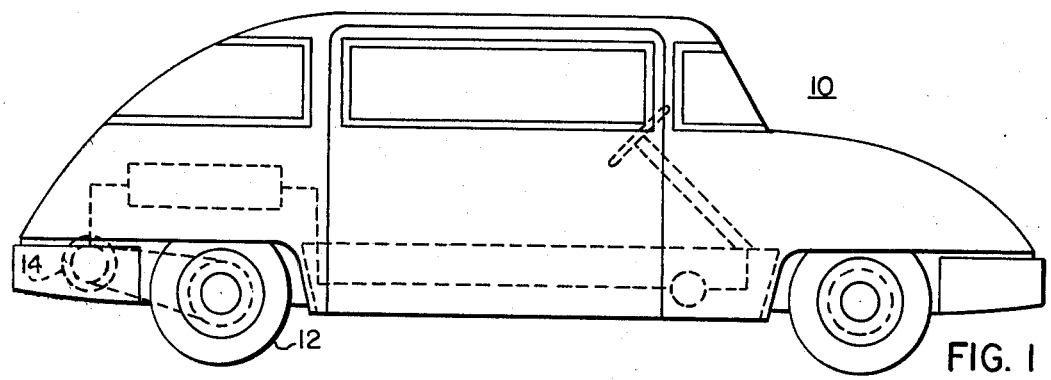
FIG. 1 is a side view of an electric vehicle.

Referring now to the drawings there is shown an electric vehicle 10 utilizing the teaching of the present invention. Electric vehicle 10 has drive wheels 12 driven through a drive system by DC motor 14 to move electric vehicle 10. The DC drive motor 14 is of the type having shunt field windings 18 which can be separately excited. A DC power supply which is a battery pack 16 supplies power to the armature of the DC drive motor 14. Switching of the DC power supply 16, shown in FIGS. 2, 3 and 4, utilizes the teaching of the present invention. Separately excited field windings 18 are supplied with an excitation current controlled by field controller 30. The excitation current passing through field windings 18 controls the torque speed characteristics and the regenerative braking of the separately excited DC drive motor 14. The use of field control for electric vehicles is desirable because only the low power of the shunt field 18 need be controlled. This provides a simple, low weight, low cost control. Field control using a battery reconnect as taught in the present application can provide a speed range which corresponds roughly to the internal combustion engine. Large current surges are normally encountered when switching operating voltages supplied to the DC drive motor 14 from a low voltage level, such as 48 volts, to a high voltage level, such as 96 volts. These large currents are the result of the long field time constant relative to the short armature time constant. In prior art reconnectors where the batteries are simultaneously switched from a low voltage level, such as 48 volts, to a high voltage level, such as 96 volts, armature currents of five or more times the desired value can flow because the back emf ($E_{emf}$) of the DC drive motor 14 remains low until the field current has time to build up. These high current surges are undesirable because of high transient torques which cause jerky and uneven vehicle operation. High current surges also shorten brush and commutation life, increase battery losses and accelerate aging.

Figure 2:
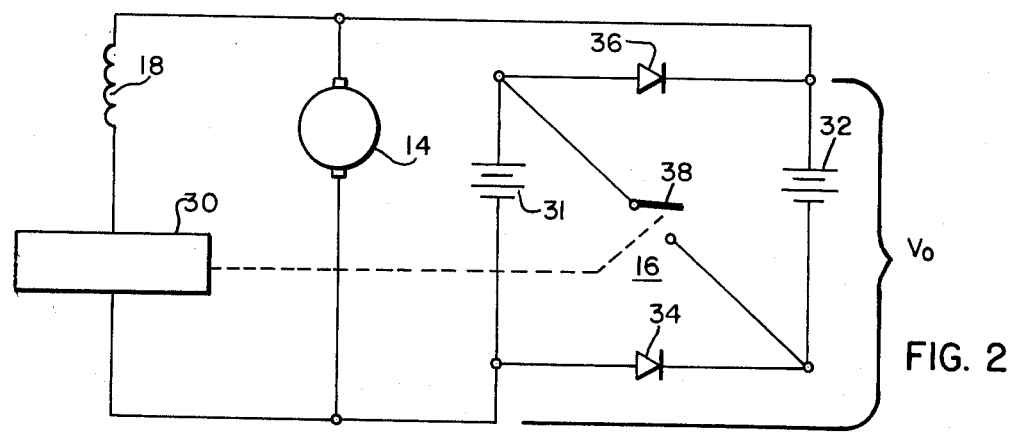
FIG. 2 is a schematic of a battery reconnect construction utilizing the teaching of the present invention.

Referring now to FIG. 2, there is shown a schematic of a battery reconnect for an electric vehicle utilizing only a single contact or switch 38. The back emf ($E_{emf}$) of drive motor 14 is a function of the field and motor speed. That is, $$E_{emf} = k\, n\, \phi$$

where $k$ is a constant determined by the motor parameters, $n$ represents the motor speed and $\phi$ represents the per-unit magnetic field flux. The armature current $I_a$ flowing through motor 14 depends upon the open circuit battery voltage $E_{BO}$; the battery resistance $R_B$; the armature resistance $R_A$; and the back emf ($E_{emf}$). Expressed as a mathematical equation:

$$I_a = \frac{E_{BO} - E_{emf}}{R_A + R_B}$$

For a typical electric vehicle representative values are $R_A = 0.015$ ohms, $R_B$ for the low voltage connection is 0.010 ohms, $E_{BO} = 48.2$ volts for the low voltage parallel battery connection. For a typical value of $k = 0.05$ the back emf for 100% field, where $\phi = 1.0$ per unit, at 960 rpm base speed is 48 volts determined as follows:

$$E_{emf} = .05 n\phi = \frac{960}{20}(1) = 48 \text{ volts}$$

For this connection the armature current $I_a$ can be determined as follows:

$$I_a = \frac{E_{BO} - E_{emf}}{R_A + R_B} = \frac{48.2 - 48.0}{0.015 + 0.010} = \frac{0.2}{0.025} = 8 A$$

When running under load at a speed for which a reconnect is feasible a typical condition would be:

$\phi = 0.5$, $E_{BO} = 48.2$ volts, $R_A = 0.015$ ohms, $R_B = 0.010$ ohms, $n = 1800$ rpm $$E_{emf} = \frac{1800}{20}(0.5) = 45 \text{ volts}$$

Armature current $$I_a = \frac{48.2 - 45}{0.015 + 0.010} = 12.8 A$$

A sudden reconnection to $E_{BO} = 96.4$ volts with $R_B = 0.040$ which is the internal resistance for series connected batteries, $n = 1800$ rpm and $\phi$ initially at 0.5 would result in an armature current which would approach:

$$I_a = \frac{96.4 - 45}{0.015 + 0.04} = 934 A$$

The high current transients produced are clearly undesirable and detrimental to the electric vehicle components. The reconnect arrangement shown in FIG. 2 which uses only a single contact provides a reliable reconnect into both higher and lower voltages without undesirable transients.

Figure 6:
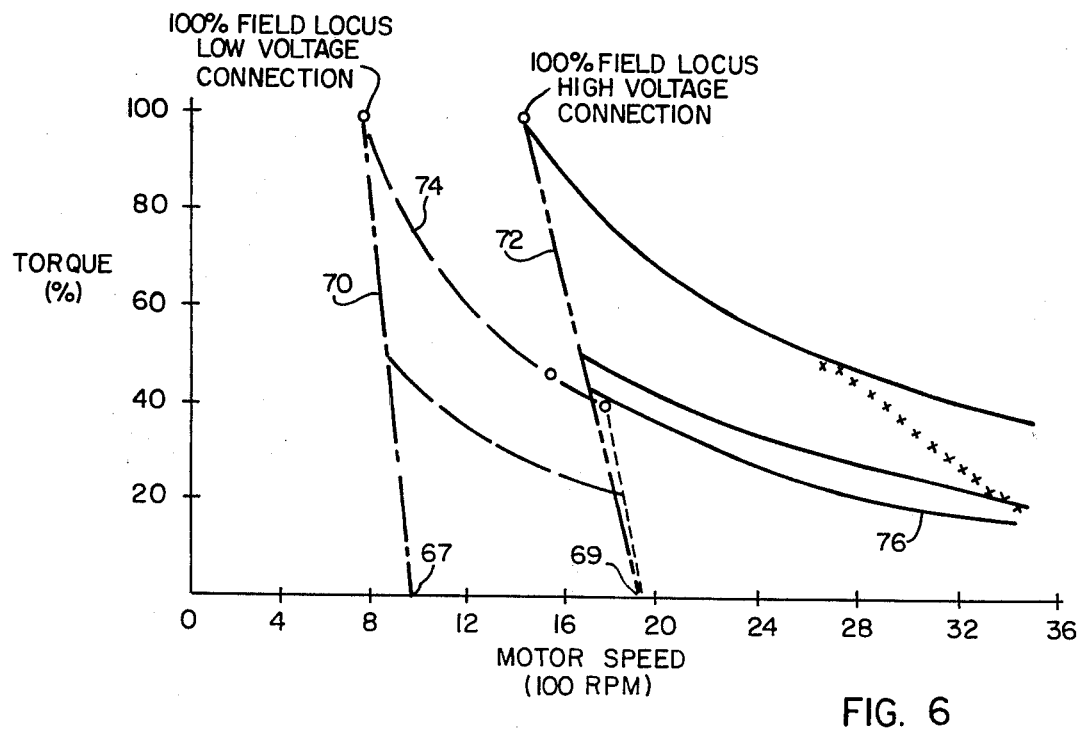
FIG. 6 is a graph showing torque versus motor speed for high voltage and low voltage battery connections.

Referring now to FIG. 6 there is shown a family of curves of output torque versus motor speed for various values of armature current. Curves are shown for both the low voltage connection and the high voltage connection. A locus 70 of points obtained with 100% field excitation is shown for the low voltage connection. A similar locus 72 for a high voltage connection is also shown. Due to improved efficiencies it is desirable to operate with the high voltage connection whenever possible. However, operation with the high voltage connection in the region to the left of locus 72 is not desirable since greater than 100% field excitation would be required and motor control would be poor. In operation, the motor speed is increased by decreasing the field excitation. For example, referring to FIG. 6, in a typical situation with armature current, $I_a$, equal to 400A motor speed can be determined from curve 74.

As field excitation is decreased to say 50%, where $\phi = 0.5$ per unit, speed is increased to approximately 1800 rpm. At speeds greater than this the operating curve 74 extends to the right of the 100% field excitation locus 72 for the high voltage connection, and practical operation in the high voltage connection is possible. To reconnect batteries 31 and 32 to the high voltage series connection without a torque surge it is necessary to match the motor operating curve 74 for the low voltage connection to a compatible motor operating curve for the high voltage connection such as 76. For motor operation on curve 76 at the given speed it is necessary that field excitation be increased to approximately 100%. To accomplish this the batteries can be isolated from the drive motor 14 and switched to the high voltage connection. The field excitation can be increased to 100%, and when this approximate level is reached the batteries, in the high voltage connection, can be switched into the drive motor circuit without undesirable current surges. The motor operating curve will then be curve 76. The desired switching may be accomplished with the circuit shown in FIG. 2.

The power supply 16 as illustrated in FIG. 2 comprises two batteries 31 and 32 which can be operated in series or parallel. Diodes 34 and 36 are provided for parallel operation of batteries 31 and 32. A switch 38 is provided in a series path through batteries 31 and 32 to permit series connection of batteries 31 and 32. With batteries 31 and 32 connected in parallel the output voltage $V_O$ of power supply 16 is at a low voltage level. For batteries 31 and 32 having an output voltage of 48 volts the output voltage of power supply 16 with the batteries 31 and 32 connected in parallel is 48 volts. Base speed for the electric motor is the speed at 100% field excitation for which torque output is zero. This is represented in FIG. 6 by point 67 for a low voltage connection and point 69 for a high voltage connection. These points correspond to the motor idle speed. For a typical DC drive motor with separately excited shunt field a base speed for the parallel battery voltage corresponds to approximately 960 RPM. With batteries 31 and 32 connected in series the output voltage $V_O$ of power supply 16 is equal to approximately 96 volts. The base speed for this voltage corresponds to a DC drive motor speed of 1920 RPM. Full field current is required to obtain the base speed. The resistance of the field circuit must be low enough to permit full field current when the DC drive motor 14 is operating from the low voltage parallel battery connection. When acceleration is required the field is weakened which lowers $\phi$ and the emf. More current is drawn and the motor accelerates. As shown above, when the DC drive motor is running at 1800 RPM with $\phi = 0.5$ per unit and direct connection is made to a high voltage, such as 96 volts, undesirable current surges are produced. The switching and field control apparatus shown in FIG. 2 can provide a reliable reconnect into both higher and lower voltages without undesirable current transients. With the switch 38 in the open position the DC drive motor 14 operates from the low battery voltage, for example, 48 volts. The base speed 960 RPM for this voltage corresponds to the vehicle motor idle speed. Full field current is required to obtain the base speed indicated at point 67. To accelerate, the field is weakened and this lowers field $\phi$ and $E_{emf}$. When the motor is running at 1800 RPM at the low voltage connection a typical field value is 0.5 per unit. When a reconnection to a high voltage, for example the 96 volt series connection, is desired the field control 30 changes to permit full field current to flow which increases field flux and the $E_{emf}$. Motor 14 tries to act as a generator since the $E_{emf}$ is greater than the power supply's low voltage level of approximately 48V but the drive motor 14 cannot cause reverse charging current to flow into the batteries because of the diodes 34 and 36. The increased voltage generated by DC drive motor 14 however is applied to the field 18 and this further accelerates the increase in the field current. If this condition were allowed to persist the field current would rise to about twice its normal full field value. Therefore, the field current can increase to its full field value in less than one field time constant. AS the field current flowing through motor field 18 increases towards full value the back emf approaches a value satisfactory for reconnecting the power supply in the high voltage series mode. For example, with batteries 31 and 32 having an output of 48 volts, the back emf approaches 90 volts. This can be calculated as follows:

$$E_{emf} = \frac{n\phi}{20} = \frac{1800}{20}(1) = 90 \text{ volts}$$

When the field current reaches satisfactory level, a series circuit through the power supply is completed by closing switch 38 thereby placing batteries 31 and 32 in series and reverse biasing diodes 34 and 36. At this time, operation of the field controller 30 permitting full field current to flow is discontinued allowing the normal electric vehicle control system to determine the field current value. The armature current which flows when switch 38 is closed is limited to a reasonable value. Armature current at the time of reconnect can be determined as follows:

$$I_a = \frac{96.4 - 90}{0.015 + 0.040} = 118 \, A$$

The time for closing switch 38 can be determined by any one of several methods such as:

a. sensing when the field current approaches its normal full field value, b. sensing when the back emf equals a given predetermined value, for example with a series reconnect voltage of 96 volts sensing when the back emf equals 85 volts would be satisfactory, or c. sensing when the voltage across switch 38 falls to a given predetermined value such as 10 volts, or d. by a timing signal derived from a time delay means which is activated by the signal that demands full field current from controller 30. The time delay is selected to provide adequate time for the field current to approach its normal full field value.

When vehicle 10 decelerates below a given speed it is desirable to reduce motor speed below the base speed corresponding to the high voltage series battery connection which is approximately 1920 RPM for a power supply voltage of 96 volts. To reconnect the batteries 31 and 32 for parallel operation at the lower voltage switch 38 is opened. This does not cause a decelerating jerk as would be present in the prior art switching schemes because diodes 34 and 36 prevent the flow of large regenerative currents into the battery. Drive motor 14 simply slows down smoothly until the motor emf, $E_{emf}$, falls below the parallel battery voltage of 48 volts.

Figure 3:
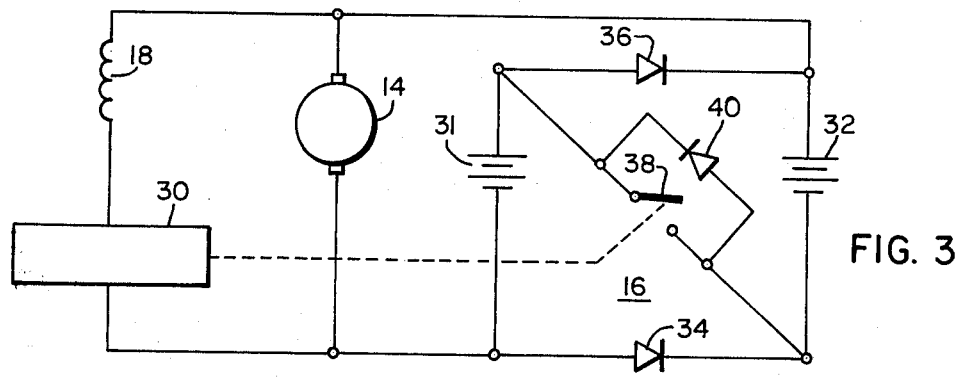
FIG. 3 is a schematic similar to FIG. 2 utilizing a surge suspression diode.

Referring now to FIG. 3, there is shown an embodiment of the invention similar to that shown in FIG. 2 but with a diode 40 connected around switch 38. Diode 40 connected across switch 38 protects diodes 34 and 36 from transient voltages and also prevents high voltages from appearing across switch 38 when open.

Figure 4:
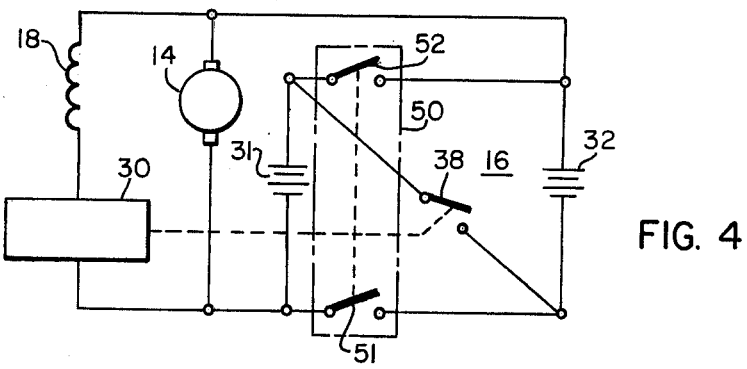
FIG. 4 is a schematic showing another embodiment for switching batteries in an electric vehicle.

Referring now to FIG. 4 there is shown a battery reconnect scheme using switches disposed in the series and parallel paths through the batteries 31 and 32. A double pole switch 50 is disposed with poles 51 and 52 in the parallel paths through batteries 31 and 32. Switch 38 is disposed in the series path through batteries 31 and 32. To switch the connection of the batteries 31 and 32 switches 38 and 50 are open, as shown in FIG. 4, opening all current paths through batteries 31 and 32. The current flowing through the motor field 18 is then varied to a value compatible with the reconnected voltage level expected from power supply 16. For example to go from a low voltage parallel connection to a higher voltage series connection switch 50 is opened with switch 38 remaining open. Motor field 18 excitation is then increased. This causes DC drive motor 14 to act as a generator and to produce an $E_{emf}$ which further causes field current to increase rapidly. When a satisfactory level of field excitation is reached switch 38 is closed completing the series circuit through batteries 31 and 32 and providing a higher voltage level to drive motor 14. This can be accomplished without undue current surges. For reconnecting batteries 31 and 32 from a high voltage series connection to a lower voltage parallel connection, switch 38 is opened with switch 50 remaining open thereby preventing current flow into batteries 31 and 32. The current flowing through motor field 18 is then reduced so as to reduce the motor emf, $E_{emf}$, to a value approximating the battery voltage of the parallel battery connection. When motor field reaches the desired value switch 50 is closed connecting batteries 31 and 32 in parallel. This is accomplished without any deceleration jerk.

Figure 5:
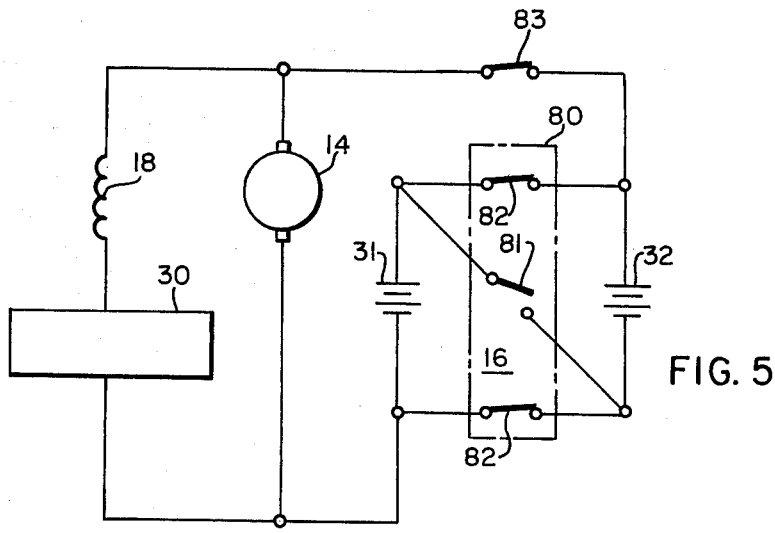
FIG. 5 is a schematic of a battery reconnect utilizing a battery isolating contactor.

Referring to FIG. 5 there is shown another schematic for reconnecting from series to parallel. This embodiment uses a single contactor 80 having normally open contacts 81 and normally closed contacts 82. An isolating contactor 83 is provided for isolating the batteries 31 and 32 from drive motor 14 during a switching operation. In normal operation to change connection of batteries 31 and 32, isolating contactor 83 is opened, the batteries 31, 32 connections are switched, field excitation is changed to a proper value and then isolating contactor 83 is closed. This provides the same result as the above described embodiments in that the armature is disconnected from the batteries during the time that the field current is being forced to the new desired value.

The disclosed invention has advantages over prior art battery reconnect apparatus such as: eliminating high positive current transients during reconnection from a low battery voltage to a high battery voltage; elimination of large negative current transients during reconnection from a high battery voltage to a low battery voltage; equal drain on all batteries in both the high voltage series and the low voltage parallel connections; and the method of increasing the field excitation while preventing any large current flowing into the battery and then closing the reconnected circuits after the field current has reached the given value prevents undesirable current surges.

Figure 7:
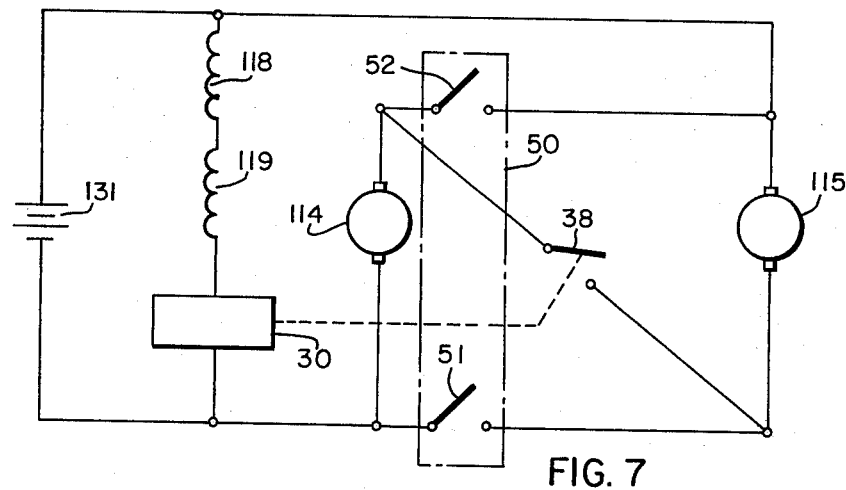
FIG. 7 is a schematic similar to FIG. 4 but utilizing a plurality of drive motors.
Figure 8:
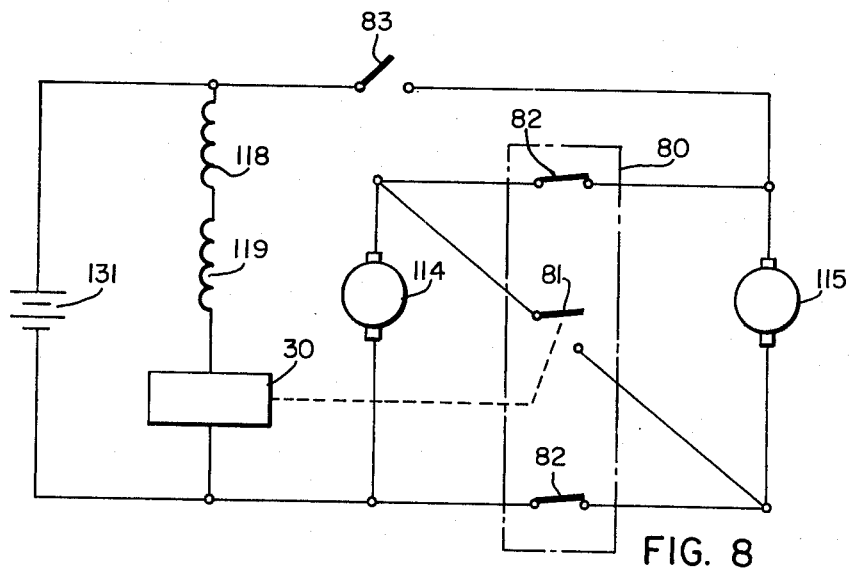
FIG. 8 is a schematic similar to FIG. 5 but utilizing a plurality of drive motors.

The teachings of this invention may be applied to a system in which motors are reconnected as shown in FIGS. 7 and 8. In FIG. 7, the lower base speed is obtained with the motor armatures connected in series, that is with switch 38 closed. If battery 131 provides 96 volts, approximately 48 volts is provided to each motor in the series motor connection. Field control 30 provides current to field winding 118 of DC motor armature 114 and field winding 119 of DC motor armature 115. As the field current is reduced the motors will accelerate, for example, to 1800 RPM. At this speed, the motors may be reconnected so that the full battery voltage is applied to each motor. This is accomplished by opening switch 38 while keeping switches 51 and 52 open. The field current is then increased until it approaches the normal full field value. This increases the emf of each motor so that switches 51 and 52 can be closed to connect each motor in parallel across the battery without a large current transient. The motors are run in this parallel connection for normal high speed operation. When it is desired to drop below about 1800 RPM, the motors can be reconnected to the series connection. This is accomplished by opening switches 51 and 52 while leaving switch 38 open. The field control 30 then reduces the currents in the field windings until the back emf of each motor is equal to about half of the battery voltage. Contact 38 may then be closed without experiencing a large current or torque surge.

The connection of FIG. 8 utilizes the separate isolating switch 83 described relative to FIG. 5. It remains open during the time that switch 80 reconnects the motors and remains open until the field current is adjusted to a value to permit reclosing it without producing a large current transient or a torque surge. It should be noted that field windings 118 and 119 may be connected in parallel and controlled by controller 30 if their impedance values are suitably selected.

It will be obvious to those skilled in the art that more than two batteries or more than two motors may be reconnected using the teachings of this invention.

We claim:
1. A method for switching the power batteries connection to the armature of the drive motor in an electric vehicle driven by a separately excited direct current motor from a low voltage connection to a high voltage connection wherein the armature time constant is relatively short and the field time constant is relatively long comprising the steps of:
preventing current flow into the batteries;
increasing the current flowing through the separately excited field windings; and
completing the series connection of the batteries when field excitation reaches a predetermined level of approximately 100% of full field current.

2. A method of switching the series parallel connection of batteries in an electric vehicle propelled by a direct current motor having a separately excited field winding from a first present connection to a second desired connection comprising:
isolating the battery;
changing the field current flowing through the separately excited field to a value compatible with the speed of the direct current motor when operating in the second desired connection; and
connecting the batteries in the second desired connection after the field excitation has had sufficient time to reach the desired value.

3. An electric vehicle insulating switching apparatus for changing the connections of power batteries from parallel to series comprising:
a direct current drive motor for driving the electric vehicle including an armature, having a relatively short time constant, and a motor field winding, having a relatively long time constant, for controlling operation of said direct current drive motor;
a field control means for controlling the current flowing through the motor field winding of said direct current drive motor connected in series with said field winding;
a switch disposed in the series connected electric circuit through the batteries;
at least one of the batteries continuously supplying its output to said armature and said field winding;
said field winding connected in parallel with said armature;
current stopping means disposed in the parallel connected circuit through the batteries to prevent current flow into the batteries during a predetermined period;
sensing means for controlling the field control means to increase current flow through the field windings and for closing said switch at a predetermined field excitation value.

4. Switching apparatus in a moving electric vehicle for changing battery connections from a present connection at a first voltage level to a desired connection at a second voltage level comprising:
a direct current drive motor operable as a motor and as a generator having an armature which has a relatively short time constant;
a separately excited field winding disposed within said direct current drive motor having a relatively long time constant as compared with the armature time constant;
isolating means for preventing current flow into the battery during a switching operation;
switching field control means for changing the current flowing through said separately excited field winding during a switching operation to a value compatible with the second voltage level; and
reconnect means for connecting the batteries in the desired connection and to the drive motor when the field excitation has had sufficient time to reach a satisfactory level.

5. Switching apparatus as claimed in claim 4 wherein said isolating means comprising:
a plurality of diodes;
said diodes being connected in parallel paths through said battery to prevent current flow through parallel battery paths into said batteries; and including
a switch disposed in a series path through said battery and being open during a switching operation to prevent current flow through a series path into said batteries.

6. Switching apparatus as claimed in claim 4 for switching two batteries between series and parallel connections, wherein said isolating means comprises:
a first diode electrically connecting the positive poles of the batteries and being connected to prevent current flow into one of the batteries;
a second diode electrically connecting the negative poles of the batteries and being connected to prevent current flow into the battery;
a switch connecting the positive pole of one battery to the negative pole of the other battery for series operation and being open during a switching operation to prevent series current flowing through the batteries.

7. Switching apparatus as claimed in claim 6 including a diode connected around said switch.

8. Switching apparatus as claimed in claim 4 wherein said isolating means comprises:
- a first group of contacts disposed in the parallel paths through said batteries and being open during a switching operation to prevent current flow into the batteries through parallel paths;
- a second set of contacts disposed in the series path through said batteries and being opened during a switching operation to prevent current flow into the batteries through the series path.

9. Switching apparatus as claimed in claim 4 for switching two batteries between series and parallel connections, wherein said isolating means comprises:
- a first set of contacts electrically connecting the positive poles of the batteries and being open during switching to prevent current flow into one of the batteries;
- a second set of contacts electrically connecting the negative poles of the batteries and being open during switching to prevent current flow into the other battery; and
- a third set of contacts connecting the positive pole of one battery to the negative pole of the other battery and being open during switching to prevent series current flow through the batteries.

10. An electric vehicle comprising:
- a direct current drive motor having an armature which has a short time constant;
- a separately excited field winding, having a long time constant, disposed within said direct current drive motor and connected in parallel with said armature;
- a plurality of batteries connected to supply power to said direct current drive motor;
- switching means for changing the connection of the batteries between a series connection and a parallel connection;
- isolating means to prevent current flow into the batteries during connection switching;
- switching field control means connected to said separately excited field to vary said separately excited field before a switching operation is completed so as to reduce current transients when said switching means changes the connection of said batteries.

11. An electric vehicle as claimed in claim 10 wherein:
- said switching field control means increases the current flow through said separately excited field winding during a switching operation from parallel battery connections to series battery connections; and
- said switching field control means decreases the current flow through said separately excited field windings during a switching operation from a series battery connection to a parallel battery connection.

12. An electric vehicle as claimed in claim 10 wherein said isolating means comprises:
- a plurality of diodes disposed in the parallel paths through said batteries to prevent current flow into the batteries during switching; and
- said switching means comprises a set of contacts disposed in the series path through said batteries.

13. An electric vehicle as claimed in claim 10 wherein:
- said isolating means comprises a plurality of contacts, at least one of which is disposed in every current path through said batteries and all of which are open during a switching operation to isolate said batteries from said direct current drive motor.

14. An electric vehicle as claimed in claim 10 wherein said isolating means comprises a switch of said batteries to said direct current drive motor.

* * * * *